(12) United States Patent
De Jesus

(10) Patent No.: US 11,307,135 B2
(45) Date of Patent: Apr. 19, 2022

(54) BEARING PAD

(71) Applicant: Fabreeka International Holdings, Inc., Stoughton, MA (US)

(72) Inventor: Luis De Jesus, Swansea, MA (US)

(73) Assignee: Fabreeka International Holdings, Inc., Stoughton, MA (US)

(*) Notice: Subject to any disclaimer, the term of this patent is extended or adjusted under 35 U.S.C. 154(b) by 23 days.

(21) Appl. No.: 16/858,875

(22) Filed: Apr. 27, 2020

(65) Prior Publication Data

US 2020/0348223 A1     Nov. 5, 2020

Related U.S. Application Data

(60) Provisional application No. 62/840,747, filed on Apr. 30, 2019.

(51) Int. Cl.

| G01N 19/08 | (2006.01) |
|---|---|
| E04B 1/98 | (2006.01) |
| G01L 1/14 | (2006.01) |
| G01L 1/16 | (2006.01) |

(52) U.S. Cl.
CPC .............. *G01N 19/08* (2013.01); *E04B 1/98* (2013.01); *G01L 1/146* (2013.01); *G01L 1/16* (2013.01)

(58) Field of Classification Search
CPC .................................................. G01N 19/08
See application file for complete search history.

(56) References Cited

U.S. PATENT DOCUMENTS

| 4,742,998 A | 5/1988 | Schubert |
| 7,148,882 B2 | 12/2006 | Kamrath et al. |
| 7,578,195 B2 | 8/2009 | DeAngelis et al. |
| 7,698,962 B2 * | 4/2010 | LeFebvre ................ B61F 5/305 |
| | | 73/862.621 |
| 7,784,366 B2 | 8/2010 | Daverman et al. |
| 8,919,211 B1 | 12/2014 | Hanson et al. |
| 9,518,881 B2 | 12/2016 | Hammerschmidt |
| 10,466,118 B1 | 11/2019 | Glickman |
| 2007/0255509 A1 | 11/2007 | LeFebvre et al. |
| 2009/0055339 A1 * | 2/2009 | Bernard ............ G05B 23/0283 |
| | | 706/46 |
| 2012/0176003 A1 | 7/2012 | Ha et al. |
| 2014/0030089 A1 * | 1/2014 | Wickstrom ............. F03D 7/042 |
| | | 416/1 |

(Continued)

FOREIGN PATENT DOCUMENTS

| DE | 3728936 A1 * | 3/1989 | ............... E04B 1/36 |
| DE | 3728936 A1 | 3/1989 | |
| WO | 9904232 A1 | 1/1999 | |

OTHER PUBLICATIONS

Fabreeka, A Stabilus Company, "Reliable Solutions for Viabration Isolation and Impact Shock Control," Vibration Isolation and Shock Control, C-001-US—Feb. 2019—Rev 1.1 (16 pages).

*Primary Examiner* — Jennifer Bahls
(74) *Attorney, Agent, or Firm* — Price Heneveld LLP

(57) ABSTRACT

A resilient bearing pad or support includes resilient material and a sensor that is configured to measure one or more of acceleration, velocity, variations in load, etc. of a mass supported by the bearing pad. The sensor may be configured to wirelessly transmit data for storage and/or evaluation. The data may be evaluated utilizing predefined criteria to detect and/or predict failure of the pad and/or a mass supported by the pad.

22 Claims, 7 Drawing Sheets

(56) References Cited

U.S. PATENT DOCUMENTS

2015/0145533 A1\* 5/2015 Baileys .................. G01N 27/24
324/663
2018/0203959 A1\* 7/2018 Refsnaes ............... G01M 15/14

\* cited by examiner

BEARING PAD

CROSS-REFERENCE TO RELATED APPLICATION

This application claims the benefit under 35 U.S.C. § 119(e) to U.S. Provisional Patent Application No. 62/840,747, filed Apr. 30, 2019, entitled "BEARING PAD," which is incorporated herein by reference in its entirety.

BACKGROUND

Various types of resilient supports (e.g. bearing pads) have been developed to support building, bridges, machinery, and other such structures. Bearing pads may be configured to accommodate construction irregularities such as rotation and non-parallel load bearing surfaces, and may include PTFE to provide a sliding surface to accommodate expansion.

BRIEF SUMMARY OF THE INVENTION

Resilient bearing pads or supports according to one aspect of the present disclosure include resilient material and a sensor that is configured to measure one or more of acceleration, velocity (or speed), variations in load, etc. of a mass or structure that is supported by the bearing pad. For example, vibration isolation pads according to the present disclosure may be configured to support large structures such as buildings and bridges. The resilient pads may also be configured to support and isolate various types of machinery and/or other equipment. The pads may also be configured to provide even load distribution between two uneven surfaces. The bearing pads may also, optionally, be configured to allow for sliding due to thermal expansion and/or to isolate a supported mass from vibration and shock. The vibration isolation pads may, optionally, comprise a resilient structure including one or more of a resilient material such as rubber, and may optionally include reinforcing materials such as woven textiles and/or other fiber materials.

Another aspect of the present disclosure is a support system for structures. The support system includes a resilient pad having first and second opposite sides that are configured to engage two spaced-apart surfaces to support a structure. Forces applied to the resilient pad by the structure may be transmitted through the resilient pad. The resilient pay may, optionally, be configured to provide even load distribution between the two surfaces and/or to permit sliding of the two surfaces relative to one another and/or to isolate the supported structure from one or more of vibration and shock. The system includes a sensor that is responsive to loads applied to one or both of the first and second opposite sides of the resilient pad. The system also includes a computing device (system) that is configured to utilize the sensor data to: 1) determine if the sensor data satisfies predefined failure or degradation criteria indicating that at least one of the resilient pad and the structure that is supported by the resilient pad has degraded or failed, and/or: 2) determine a predicted lifespan of the resilient pad and/or the structure that is supported by the resilient pad.

The resilient pad may optionally include a cavity and the sensor may be disposed in the cavity. The sensor may optionally comprise a piezoelectric sensor. The resilient pad may optionally include resilient material disposed between the cavity and the first side. The resilient pad may optionally include resilient material disposed between the cavity and the second side. The resilient pad may optionally include at least one transverse surface extending between the first and second opposite side surfaces. The resilient pad may optionally include resilient material between the cavity and the at least one transverse surface. The at least one transverse surface optionally comprises a peripheral surface extending between the first and second opposite side surfaces around a periphery of the resilient pad.

The resilient pad optionally comprises first and second layers and a central layer sandwiched between the first and second layers. The central layer may optionally include a central opening therethrough forming the cavity. Opposite sides of the central layer are optionally bonded to the first and second layers.

The sensor is optionally configured to generate data corresponding to at least one of a displacement of the first side relative to the second side, a velocity of the first side relative to the second side, and an acceleration of the first side relative to the second side.

The computing device may, optionally, be configured to predict the lifespan of the structure supported by the resilient pad by comparing a measured load and number of cycles to a predicted number of cycles at which failure would occur at the measured load. The computing device is optionally configured to determine a predicted lifespan of at least one of the structures supported by the resilient pad and the resilient pad itself utilizing a relation between cyclic stress amplitude and number of cycles to failure.

The computing device is optionally configured to determine that a failure of at least one of the structure supported by the resilient pad and the pad has occurred if the sensor data indicates that a predefined rapid change in loading on the resilient pad has occurred.

The system may, optionally, include a plurality of resilient pads and sensors that are operably connected to the computing device. The plurality of resilient pads and sensors may be configured to support a single structure. The controller may be configured to determine rotation of the single structure utilizing sensor data from the plurality of sensors.

Another aspect of the present disclosure is a method of monitoring a structure. The method includes supporting a structure on a plurality of resilient pads having sensors that are configured to measure at least one parameter related to forces acting on the resilient pads. The method further includes utilizing a predefined relationship between the measured parameter and a predicted failure of the structure to determine at least one of a failure of the structure and a predicted failure of the structure.

The parameter measured by the sensors may optionally comprise force, and the method may optionally include utilizing a computer model of the structure to determine stress levels in the structure as a function of forces acting on the resilient pads. The method may, optionally, include utilizing material properties of the structure to determine a predicted failure of the structure.

The forces acting on the resilient pads may be cyclical, and the method may, optionally, include utilizing an S-N curve comprising a relationship between cyclic stress amplitude and number of cycles to failure to determine a predicted failure of the structure.

The structural integrity of the structure may degrade over time, and degradation of the structural integrity of the structure may result in changes in the measured parameter. The method may include utilizing the measured parameter and predefined criteria to determine the present structural integrity of the structure. Degradation of the structure may result in at least one of: 1) a change in force distribution among the sensors, and: 2) a change in a natural frequency of the structure that can be detected based at least in part on the measured parameter. The method may include determining the present structural integrity of the structure based, at least in part, on at least one of: 1) a change in force distribution among the sensors, and: 2) a change in a natural frequency of the structure.

The method may optionally include utilizing the measured parameter to: 1) detect degradation or failure of at least one resilient pad, and/or: 2) predict a lifespan of at least one resilient pad.

The method optionally includes utilizing data from the sensors to determine movement of the structure. Determining movement of the structure may, optionally, include determining a rotation of the structure.

DETAILED DESCRIPTION

Figure 1:
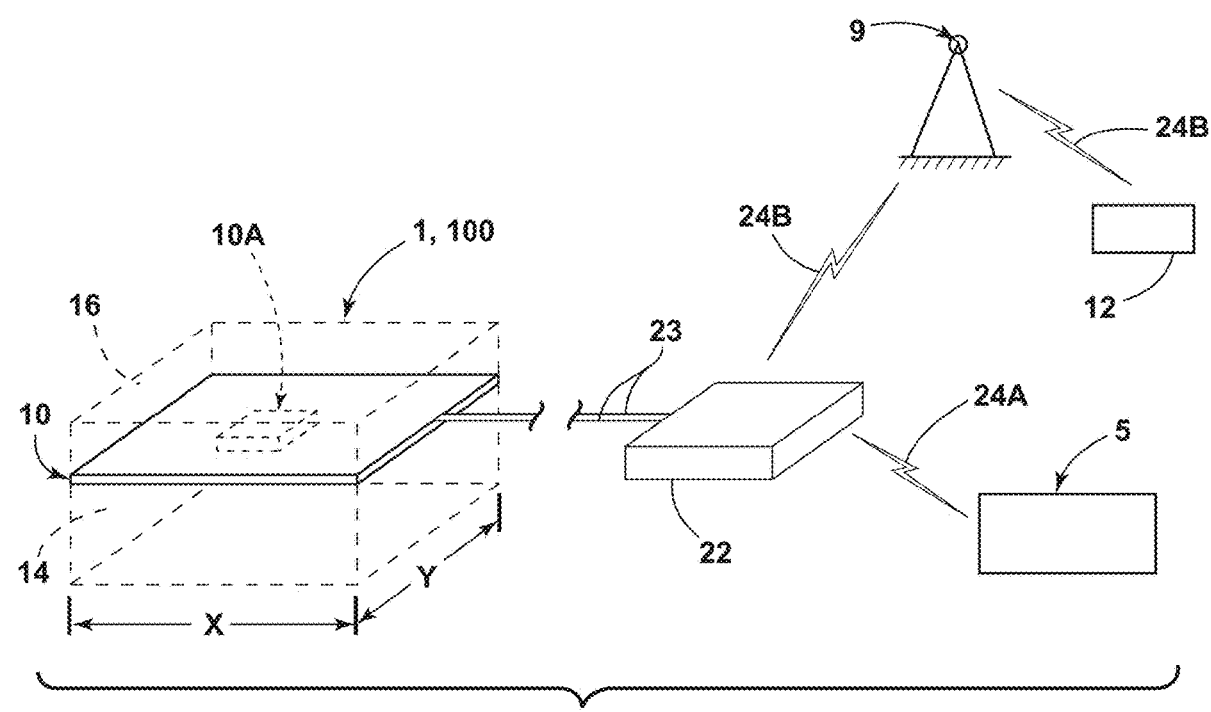
FIG. 1 is a partially fragmentary isometric schematic showing a bearing pad and sensor system according to one aspect of the present disclosure.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Figure 2:
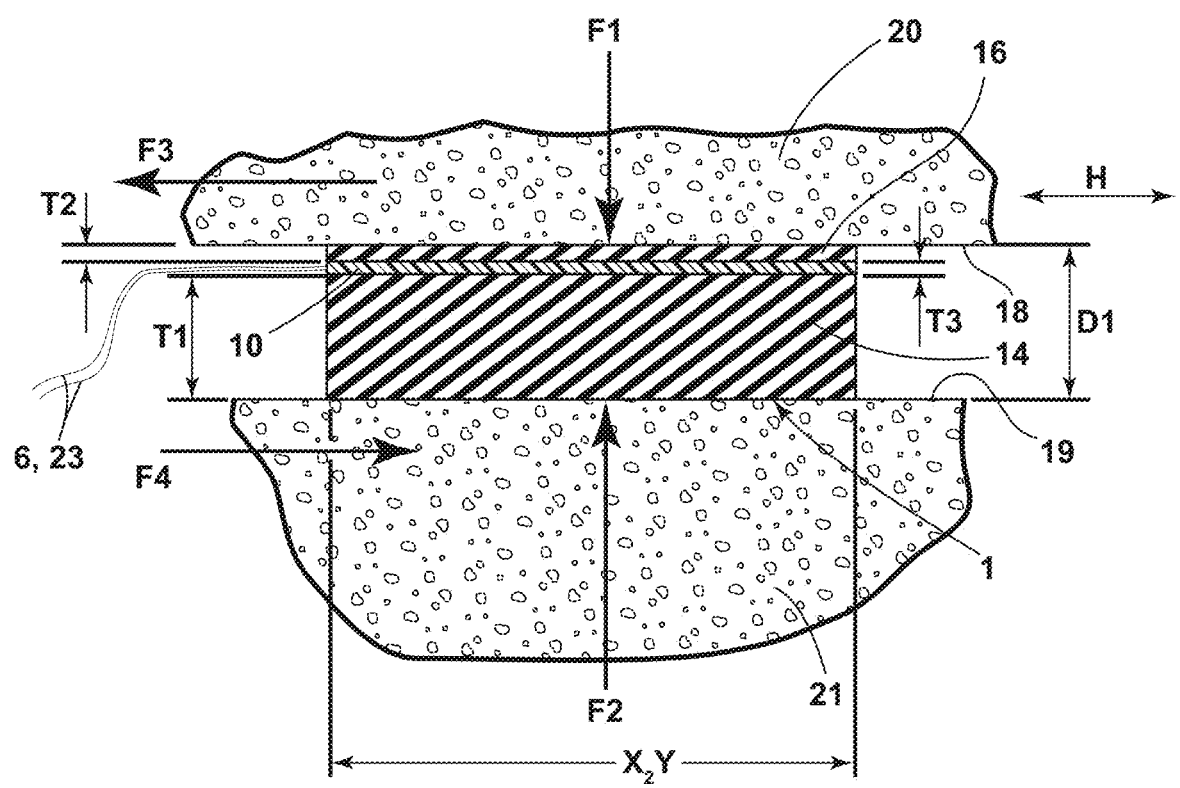
FIG. 2 is a partially fragmentary cross-sectional view of a bearing pad and sensor.
Figure 3:
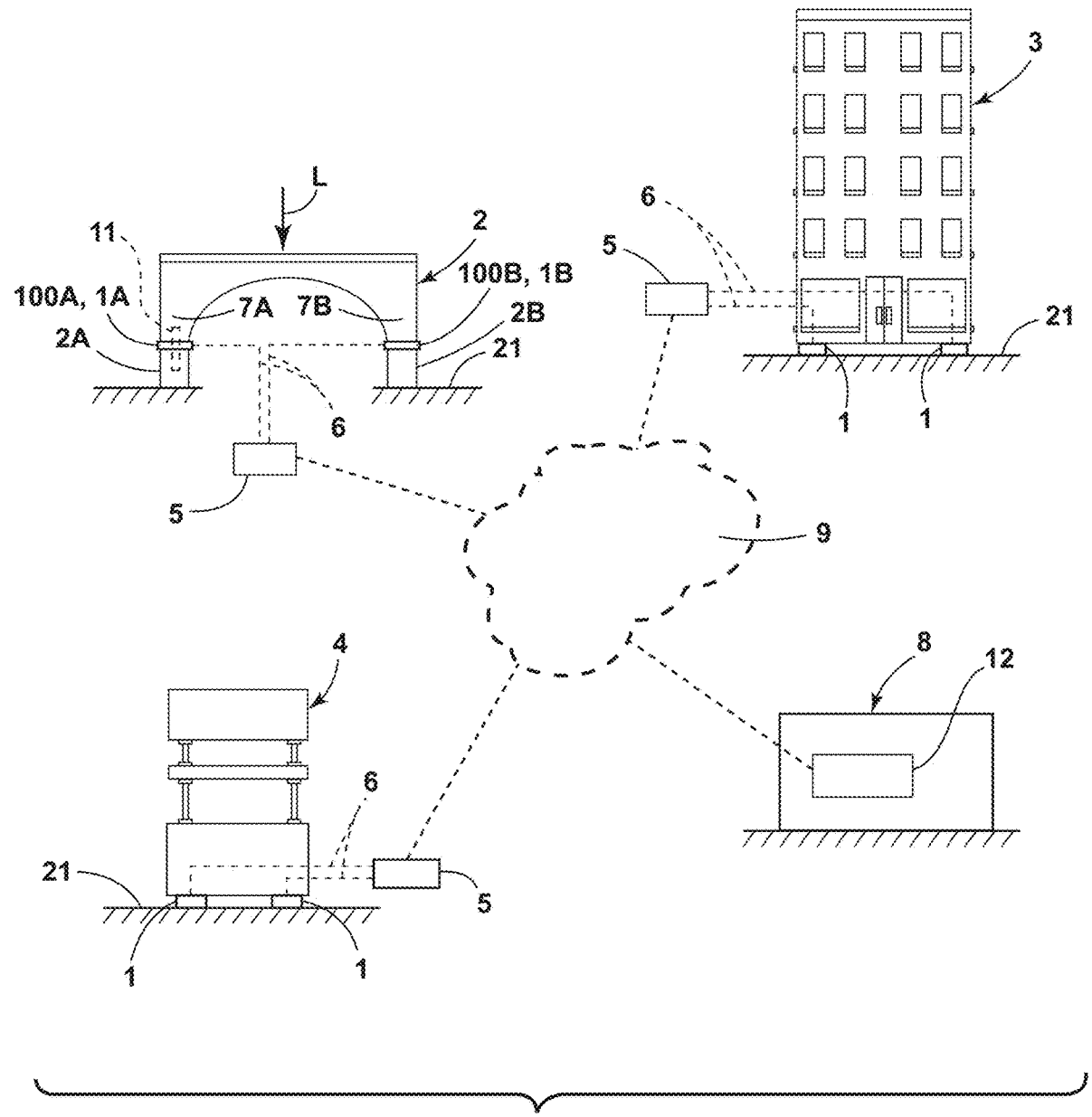
FIG. 3 is a schematic showing bearing pads and sensors in various applications.
Figure 4:
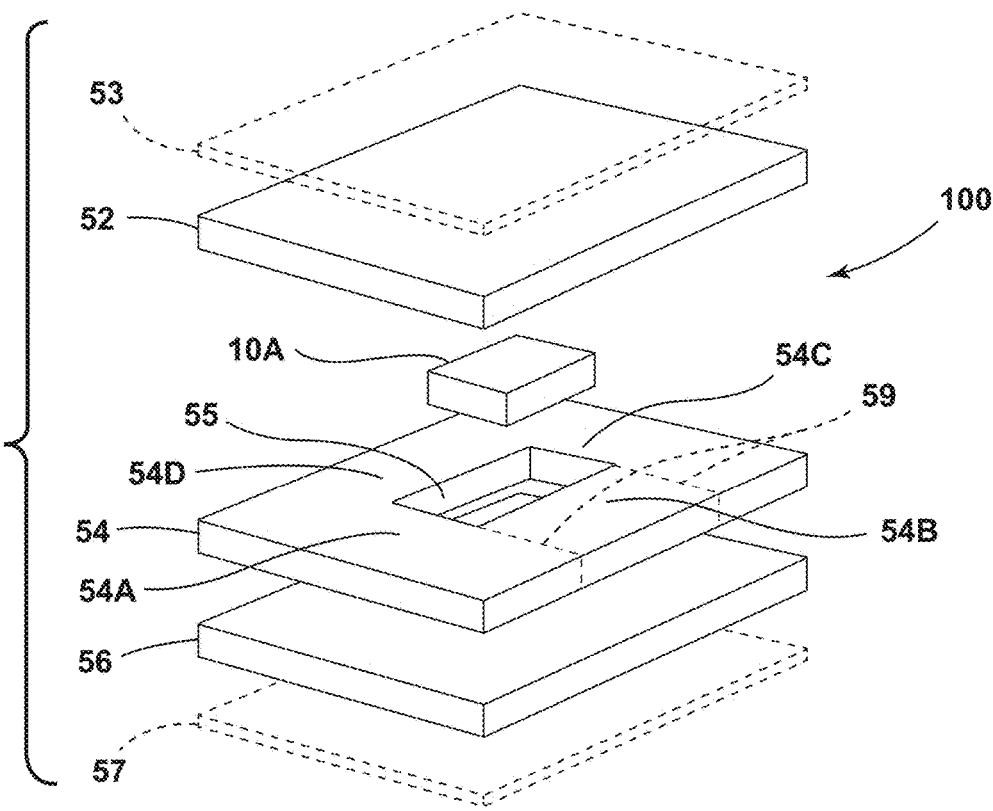
FIG. 4 is a partially schematic exploded isometric view of a resilient pad and sensor according to another aspect of the present disclosure.
Figure 5:
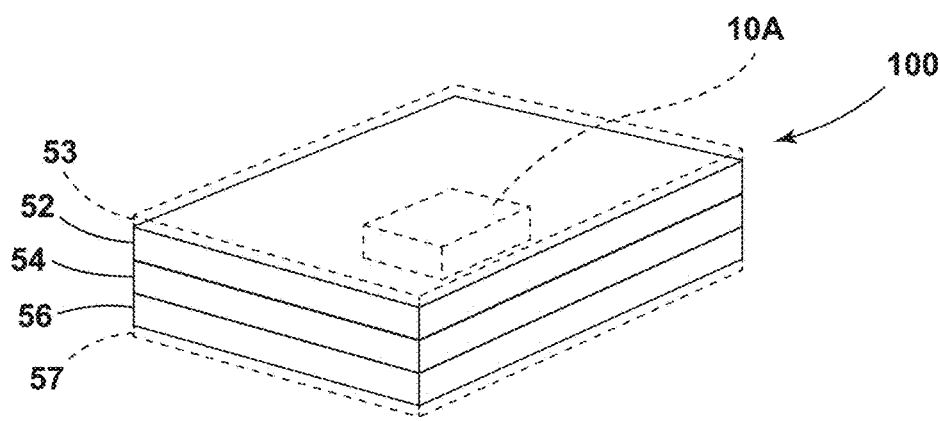
FIG. 5 is a partially schematic isometric view of the resilient pad and sensor of FIG. 4.
Figure 6:
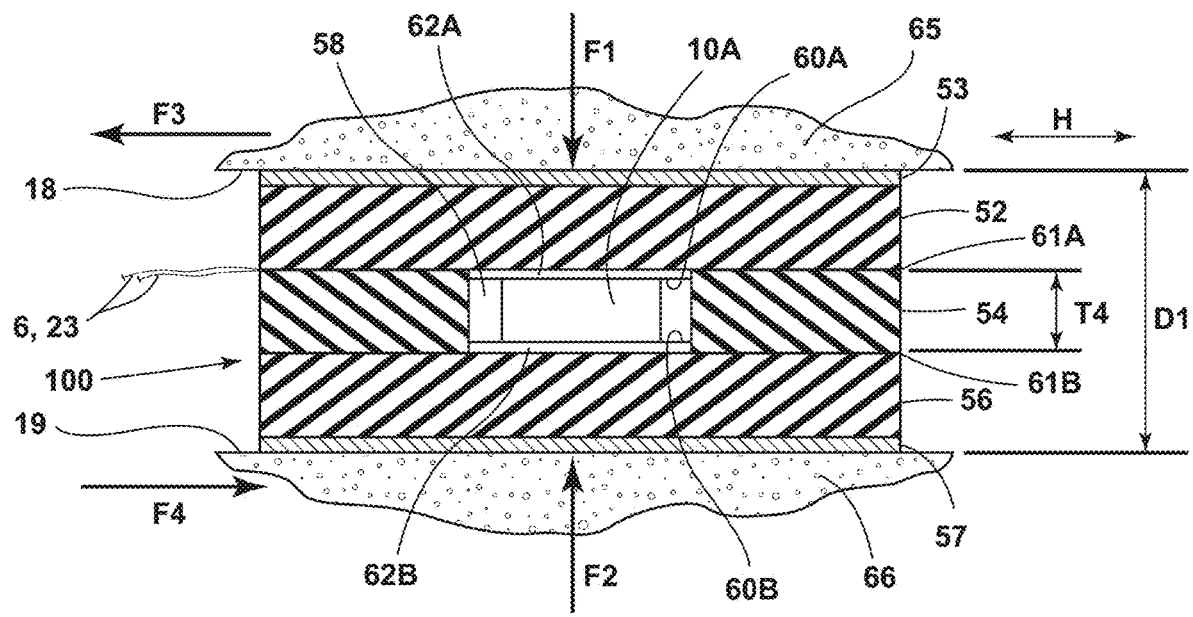
FIG. 6 is a partially schematic, partially fragmentary cross-sectional view of the resilient pad and sensor of FIG. 5.

With reference to FIGS. 1-3, one aspect of the present disclosure is a bearing pad 1 (or 100) including sensor 10 (or 10A) that is configured to collect information (data) concerning one or more of force and/or acceleration and/or velocity (speed) and/or movement of a bridge 2, building 3, machinery/equipment 4, or other structure and/or to monitor this information in real-time and/or to store the data. As discussed in more detail below, the system may include a pad 1 and sensor 10 (FIG. 2) or a pad assembly 100 and sensor 10A (FIGS. 4-6). The sensor 10, 10A may, optionally, be configured to wirelessly transmit data to a system capable of storing and/or analyzing the data. Although the sensor 10, 10A is preferably configured to transmit data wirelessly, the sensor 10, 10A may also be connected to a computing device 5 via "hard" lines 6 or other suitable data transmission arrangement. Lines 6 may comprise electronically and/or optically conductive lines.

With reference to FIG. 3, a plurality of computing devices 5 may be configured to communicate with a facility 8 via a communication device or system such as network 9. Network 9 may comprise a global network (the "internet") or it may comprise a local network. The facility 8 may be remotely located, and may include a computing system 12 that is configured to monitor and/or analyze data from one or more bearing pads 1 (or 1A) at a plurality of locations. Computing system 12 may comprise virtually any suitable device such as one or more PCs, one or more smartphones, etc. In general, a large number of bearing pads 1, 1A including sensors 10, 10A may be located at numerous locations such as one or more bridges 2, one of more buildings 3, one or more machines/equipment 4, etc. as required. In the illustrated example, each individual location (e.g. bridge 2, building 3, equipment 4) includes one or more computing devices 5. However, the bearing pads 1, 1A may be configured to transmit and receive data from computing system 12 of a remote facility 8 without use of individual computing devices 5. Conversely, it will be understood that each individual location (e.g. bridge 2, building 3, equipment 4) could comprise a "stand-alone" installation in which the computing device 5 is not connected to a computing system 12 of a remote facility 8. For example, computing device 5 may be configured to monitor and/or analyze computing devices or system 12 and/or one or more sensor data and transmit the results to one or more smartphones.

Still further, some individual locations may comprise stand-alone installations, and some locations may be operably connected to computing system 12 of facility 8. Also, a plurality of remote facilities 8 having computing systems 12 could be utilized if required. For example, a company could have a facility 8 that is operably connected to a number of machines 4, and a government entity could have a separate facility 8 that is operably connected to a plurality of sensors 10 of bridges 2 within a geographical area. Bridge 2, building 3, and equipment 4 are merely examples of applications in which bearing pad 1, 1A and sensors 10, 10A may be utilized. The bearing pads 1, 1A and sensors 10, 10A may be utilized in a wide variety of applications involving load conditions such as shock and/or vibration isolation in virtually any structure, mechanism, or device. The stored sensor data may be utilized by a system that may include one or more computing devices 5, 12 to evaluate changes in the sensor data over time to detect and/or predict failure of the bearing pad 1 and/or the structure or device that is supported by the pad 1. As discussed in more detail below, the sensor data may be compared to expected sensor data to detect degradation (e.g. failure) of the pad and/or the structure supported by the pad. The sensor data may also be utilized to determine loading (e.g. stress) acting on the structure overtime. The stresses can be utilized to determine degradation and/or to predict failure of the pad and/or the structure utilizing material properties (e.g. an S-N curve) or other suitable criteria.

With reference to FIG. 2, bearing pad 1 may comprise a block or layer 14 of resilient material (e.g. hard rubber or other suitable material), a sensor layer 10, and a second layer of resilient material 16. The sensor 10 is preferably sandwiched/disposed between the layers 14 and 16 of resilient material. In use, the bearing pad 1 (or 100) is positioned between surfaces 18 of a structure or mass 20 and a surface 19 of a support 21. The surfaces 18 and 19 may generate compressive forces "F1" and "F2" and/or transverse (shear) forces "F3" and "F4." One or more of the forces F1-F4 may comprise static (constant) forces or at least one of the forces F1-F4 may vary at least somewhat over time due to forces applied to the structure. For example, as vehicles go over bridge 2 (FIG. 3), the pads 1, 100 -supporting bridge 2 will be subject to forces F1 and F2 that are not constant. Similarly, pads 1, 100 supporting building 3 may experience time-varying forces due to siesmic activity, wind, or other external lands or buildings 3. The resilient material 14 and/or 16 may be configured to provide shock and vibration isolation, and the sensor 10, 10A is preferably configured to measure one or more of the forces F1-F4 applied to the bearing pad 1, 100. The resilient material 14 has a thickness "T1" that may be selected as required for a particular application to provide a required degree of isolation. For example, the thickness T1 may be relatively small (e.g. about 0.10-about 0.25 inches) for some applications, or the thickness T1 may be significantly larger (e.g. about 1-about 6 inches) for other applications. The resilient material 16 has a thickness "T2" that may be the same or smaller or larger than the thickness T1 of material 14. In the illustrated example, thickness T2 is less than thickness T1. The thicknesses T1 and T2 may comprise a wide range of thicknesses as required for various applications. Also, the thicknesses of layers 14 and 16 are preferably, but not necessarily, substantially uniform. Furthermore, although sensor layer 10 is preferably sandwiched between layers 14 and 16 of resilient material, bearing pad 1 may comprise a single layer 14 or 16 of resilient material. The perimeter of bearing pad 1 (or 100) may have a rectangular shape, a circular shape, an oval shape, an irregular shape, or virtually any other shape. The thicknesses T1, T2, and the dimensions X, Y (FIG. 1) of the perimeter of pad 1 or 100, as well as the material properties (e.g. modulus or elasticity) of the layers 14 and 16 (or 52, 54, 56) may be selected as required for a particular application. Typically, the pad 1, 100 is designed to provide vibration and/or shock control as required for a particular application such that pad 1, 100 isolates a structure and also measures one or more variables such as the forces applied to pad 1, 100, and/or the deflection of pad 1, 100 (e.g. movement of supported mass 20 relative to support 21), and/or the acceleration of pad 1, 100 (e.g. acceleration of supported mass 20 relative to support 21). However, pad 1, 100 may be configured primarily for purposes of measuring one or more variables and the layers 14 and/or 16 (or layers 52, 54, 56; FIGS. 4-6) may be configured to provide minimal (or zero) vibration and/or shock control.

In use, as shown in FIGS. 2 and 6, due to forces F1-F4, a vertical dimension "D1" between surfaces 18 and 19 may vary (change), and the upper surface 18 may also translate horizontally as shown by the arrow "H" relative to lower surface 19. Surface 18 may be formed by a supported mass 20 and surface 19 may comprise a support 21. The support 21 may comprise a foundation utilized to support the supported mass 20. As discussed in more detail below, the sensor 10 (or 10A) may be configured to measure and monitor one or more of acceleration, velocity (speed), and/or changes in loads of surface 18 relative to surface 19. The bearing pad 1 (or 100) and computing system or device 5 and/or 12 may, optionally, be configured to monitor the performance of bearing pad 1, 100 with respect to natural frequency, and/or damping %, and/or other parameters that may be related to the condition and/or performance of bearing pad 1, 100 and/or the supported mass 20 and/or the support 21. The computing system or device 5 and/or 12 may, optionally, be configured to monitor variables such as acceleration, velocity, and variation in load of the supported mass 20 relative to the support 21. The computing system 5 and/or 12 may, optionally, be configured to utilize data collected from bearing pad 1, 100 over a period of time (historical data) and this historical data may, optionally, be utilized to predict failure of the bearing pad 1, 100 and/or the supported mass 20 and/or the support 21. For example, if the distance D between surfaces 18 and 19 changes over time when constant loads F1 and F2 are applied, the change in distance D may indicate that a failure of the bearing pad 1, 100 and/or of the structure supported by the bearing pad 1, 100 has occurred, or is likely to occur. According to a more specific example, if supported mass 20 (e.g. bridge 2 or building 3; FIG. 3) is supported by a plurality of bearing pads 1 (or 100), a significant change in distance D of only one bearing pad 1 (or 100) may dignify a structural failure or defect in the supported mass causing the distribution of the loads on the bearing pads 1 (or 100) to change.

Empirical data concerning failure of one or more of the resilient materials (14, 16, 52, 54, 56) may be utilized to detect and/or predict failure of bearing pad 1 or 100. It will be understood that this is merely an example of one type of data that could be collected and one type of predefined failure criteria that may be utilized to detect and/or predict failure or reduced or degraded performance. Virtually any data collected by bearing pad 1 (or 100) may be utilized to detect failure and/or predict failure of pad 1 and/or supported mass 20 and/or support 21. It will be understood that the predefined failure criteria may comprise a reduction in shock and/or vibration isolation of pad 1, and the failure detection and/or prediction may comprise criteria other than catastrophic or complete failure of one or more components of the bearing pad 1 (or 100) and/or supported mass 20 and/or support 21. Thus, in general, as used herein, the term "failure" may include structural failure (e.g. collapse or other major structural change) and predefined degradation or changes to the pad or structure other than complete failure. For example, the predefined failure criteria may comprise an unacceptably high risk of major structural failure.

Referring again to FIG. 1, sensor 10 (or 10A) may be operably connected to a wireless transmitter 22 via conductors 23. The wireless transmitter 22 may comprise a Bluetooth transmitter or other short range wireless device that is configured to communicate with a local computing device 5 via short range wireless signals 24A. The wireless transmitter 22 may also be configured to communicate with one or more remote devices 12 utilizing long range wireless signals 24B via network 9. It will be understood that the network 9 may comprise a world-wide network including a large number of devices that are operably interconnected via fiber optic lines, conductive lines, wireless devices, etc.

A sensor 10 or 10A may be, optionally, integrated into bearing pad 1 or 100, respectively, during fabrication of bearing pad 1 or 100. The pad 1 or 100 and sensor 10 or 10A may be configured and sized as required for a specific application (e.g. a specific bridge 2, building 3, piece of equipment 4, etc.). Resilient materials 14 and/or 16 (or 52, 54, 56) of bearing pads 1, 100 and/or sensors 10, 10A may be configured to meet virtually any specified design requirements, and the present disclosure is not limited to any specific bearing pad material or configuration. Similarly, the present disclosure is not limited to any specific sensor design/configuration. The bearing pad materials and sensors 10, 10A may have virtually any suitable size, shape, construction, configuration, etc. As discussed in more detail below, the sensor 10 or 10A may comprise a capacitive sensor, a piezoelectric sensor, or other suitable sensor.

Figure 7:
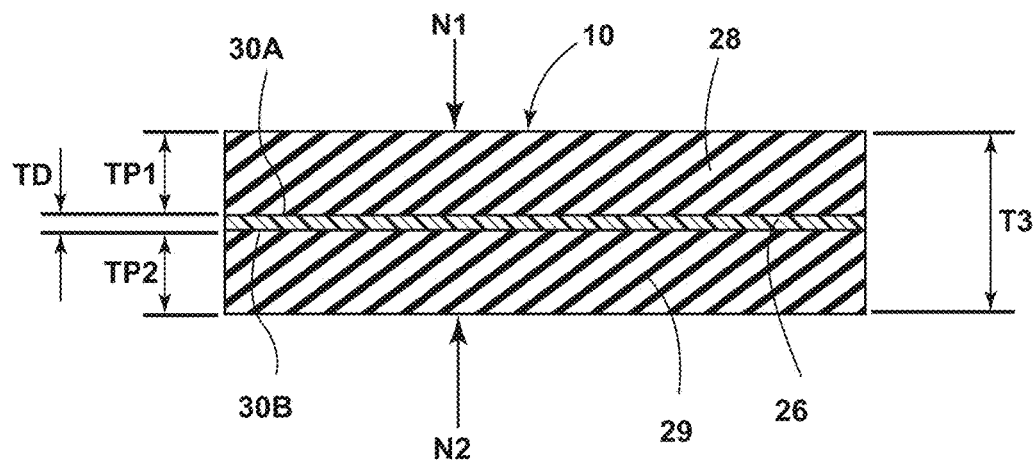
FIG. 7 is a cross-sectional view of the resilient pad and sensor of FIG. 2.

Sensor 10 may, optionally, be integrated into a bearing pad 1 during fabrication of the bearing pad 1. With reference to FIG. 7, sensor 10 may comprise a dielectric layer 26 that is disposed between conductive layers 28 and 29. Dielectric layer 26 may, optionally, comprise a layer of polytetrafluoroethylene (PTFE). However, it will be understood that virtually any suitable dielectric material and conductive materials may be utilized to form a capacitive sensor. Furthermore, it will be understood that virtually any type of sensor (e.g. piezoelectric) may be utilized in connection with a resilient material of a bearing pad 1, and the present disclosure is not limited to any specific type of sensor.

In general, dielectric layer 26 (FIG. 7) may have any suitable thickness. If PTFE material is utilized, dielectric layer 26 may have a thickness "TD" of about 0.01-about 0.1 inches thick, or more preferably about 0.03 inches thick. However, virtually any thickness may be utilized, including thicknesses outside the range noted above. The layers 28 and 29 comprises steel or other suitable conductive material. Layers 28 and 29 may have thicknesses TP1 and TP2, respectively, of about 0.1-about 0.5 inches. It will be understood that the thicknesses TP1 and TP2 may vary outside the range noted above. In one embodiment, the thicknesses TP1 and TP2 are about 0.141 inches, and the layers 28 and 29 comprise carbon steel plate material.

The sensor 10 may be integrated into bearing pad 1 by positioning sensor 10 between one or more layers 14, 16 of resilient material. Sensor 10 may be integrally molded with one or more layers 14 and/or 16 of resilient material, and/or mechanically attached, and/or adhesively attached.

The present disclosure is not limited to a specific dielectric material or adhesive. For example, epoxy or other polymer materials may be utilized as the dielectric material. Furthermore, sensor 10 (FIG. 7) may be fabricated in any required size or shape.

Bearing pads 1, 100 according to the present disclosure may be configured as required for a particular application. For example, a bridge 2 (FIG. 3) may include a first pad 1A (or 100A) that is disposed between a bridge structure 7A and a base 2A, and a second pad 1B (or 100B) that is disposed between a bridge structure 7B and a base 2B. A mounting structure 11 of a known type interconnects bridge structure 7A to base 2A in a manner that permits vertical movement of bridge structure 7A relative to base 2A, but prevents horizontal movement of bridge structure 7A relative to base 2A. Thus, in use, pad 1A, 100A is subject to vertical comprehensive forces, but pad 1A, 100A is subject to minimal or no horizontal forces.

Sensor 10 (FIG. 7) may be located adjacent to the top of the resilient material 14 and/or 16 of pad 1A. Resilient pad material (e.g. 3-4 layers) may be disposed between the bridge 2 and the sensor 10. Pad 1A may include, from top to bottom, an upper pad layer 16 (FIG. 2), a top conductive layer 28 (FIG. 4), dielectric material 26 (FIG. 4) (e.g. PTFE), a bottom conductive layer 29 (FIG. 4), and a lower pad layer 14 (FIG. 2). Pad 1A may be utilized if the support of a bridge 2 or other structure is fixed.

Sensor 10 according to another aspect of the present disclosure is configured for use in a pad 1B (FIG. 3). Pad 1B is disposed between a bridge structure 7B and a base 2B, wherein the vibration pad 1B and sensor 10 are not fixed with respect to the horizontal axis. This allows the bridge or structure 7B to slide or move horizontally somewhat relative to base 2B. This movement may be caused by expansion and contraction resulting from changes in temperature and/or other factors. Providing horizontal freedom to move at the support may reduce the fatigue and stress of the bridge under certain conditions. Unlike pad 1A and sensor configuration described above, horizontally movable pad 1B and sensor 10 may include a low friction PTFE upper layer (e.g. FIGS. 2 and 6) of the structure (e.g. bridge 2). In general, a low friction layer permits horizontal sliding and reduces the magnitude of forces F3 and F4 (FIGS. 2 and 6) between layer 16 and surface 18. A layer of LTP material may be utilized to bond the PTFE layer to the pad 1B. The sensor 10 may be placed in between the LTP material and the pad 1B to ensure that the bridge structure 7A contacts the PTFE layer to permit horizontal motion. Similarly, pad 100 and sensor 10A may also include a low friction upper (or lower) layer to reduce friction and permit horizontal movement.

Changes in capacitance may be utilized to determine an amount of force F1, F2 (FIG. 2) acting on the pad 1 and sensor 10. A magnitude of forces F1 and F2 may be determined utilizing an equation that provides the force as a function of changes in capacitance. In general, the force vs. capacitance equation may be determined theoretically or empirically.

A bearing pad 1, 100 according to the present disclosure permits monitoring one or more variables such as acceleration, vibration, and load (force) at the support areas of mechanical equipment, buildings, bridges and/or other masses that are supported by pad 1, 100. Measurements may be taken at relatively small time intervals (e.g. numerous times per second) or longer time intervals as required for a particular application. The bearing pad 1, 100 may be used to immediately detect faults and/or failures of a structure or machinery supported by the pad and/or faults and/or failures of the pad itself (e.g. if measurements are taken at small time intervals) and to communicate a warning or notification concerning the faults and/or failures to needed personnel via smartphone, smartwatch, e-mails SMS, desktop computers, etc. Furthermore, the bearing pad 1, 100 may be utilized to record parameters (data) and store the sensor data and/or processed sensor data. The historical data may be utilized to detect deterioration of the bearing pad 1, 100 and/or the supported mass and/or structure. The bearing pad 1, 100 also offers functionality to predict the end-of-life of the pad 1, 100 and/or its supported mass and/or support based on, for example, changes in natural frequency and/or damping of the pad 1, 100 and the structure supported by the pad (and/or the structure below the pad) over time.

With reference to FIGS. 4 and 5, a resilient pad and sensor assembly 100 according to another aspect of the present invention may include an upper sheet 52, an intermediate sheet 54, and a lower sheet 56. The sheets 52, 54, and 56 may be made from an elastomeric material such as rubber or other suitable material. The thicknesses, sizes, and shapes of the resilient sheets 52, 54, and 56 may be selected to provide the required degree of resiliency as required to support a structure such as a bridge, building, machinery, etc. For example, the thickness of sheets 52, 54, 56 may be substantially equal, or the thickness of one or more sheets could be greater than the other sheets.

The intermediate sheet 54 includes a cutout forming an opening 55, and a sensor 10A is disposed in a space 58 (FIG. 6) formed by the opening 55 when the sheets 52, 54, and 56 are assembled. One or more electrical lines 6, 23 may be routed between pad 54 and an adjacent pad 52 or 56 to operably connect the sensor 10A to one or more additional devices in substantially the same manner as described in connection with FIG. 1. In the illustrated example, the opening 55 of sheet 54 is quadrilateral and located in a central portion of sheet 54, and the sheet 54 includes four sections 54A-54D extending around the opening 55. However, opening 55 may have virtually any shape or size. For example, opening 55 could be open to one side as shown by the dashed lines 59. Also, opening 55 could be offset from the center of sheet 54.

When assembled (FIGS. 5 and 6), the central sheet 54 is sandwiched between resilient sheets 52 and 56, and the contact areas 61A and 61B between central resilient sheet 54 and upper and lower resilient sheets 52 and 56, respectively, may be adhesively bonded together. Optional plates 60A and 60B (FIG. 6) may be positioned in space 58 such that the plates 60A and 60B bear on opposite sides 62A and 62B, respectively, of sensor 10A. Plates 60A and 60B may be made from a rigid material (e.g. steel). However, plates 60A and 60B are not required.

As shown in FIG. 6, in use, the pad and sensor assembly 100 is positioned between surface 18 of a structure 65 and a surface 19 of a support 66. Structure 65 may comprise a bridge, building, machinery, or other structure, and the support 66 may comprise a foundation, base structure, floor surface, or other structure. Optional upper plate 53 may be positioned between upper resilient sheet 52 and surface 18 of structure 65, and an optional plate 57 may be positioned between lower resilient sheet 56 and surface 19 of support 66. Upper plate 53 may comprise a steel plate, or the plate 53 may comprise a low friction material (e.g. polytetrafluoroethylene (PTFE)) or other suitable material. Similarly, lower plate 57 may comprise a rigid material such as steel, or a low friction material such as PTFE.

Structure 65 may be subject to a transverse load F3, causing a corresponding reaction force F4. Use of a low friction material for plate 53 and/or 57 permits movement of structure 65 relative to support 66 to thereby reduce the magnitude of the forces F3 and F4 that are transmitted through the pad and sensor assembly 100. The plates 53 and 57 are optional, and the sheets 52 and 56 of resilient pad and sensor assembly 100 may be in direct contact with one or both surfaces 18 and 19, respectively.

Sensor 10A may comprise a piezoelectric sensor or a capacitive sensor that generates a signal if the dimension T4 (FIG. 6) changes due to forces F1 and F2 acting on the resilient pad and sensor assembly 100. For example, the sensor 10A may comprise a commercially available piezoelectric sensor. However, sensor 10A may comprise virtually any sensor that is capable of measuring changes in the dimension T4 and/or changes in forces applied to sensor 10A. The forces F1 and F2 acting on the pad and sensor assembly 100 may be primarily carried by the layer 54 such that the amount of force acting on sensor 10A is relatively small (e.g. 1%, 10%, or 20% of the total force F1, F2). For example, the sensor 10A may be configured to deflect due to changes in T4 without a significant amount of force being transmitted through the sensor 10A. Restated, the stiffness of sensor 10A relative to the stiffness of the intermediate layer 54 may be very small, such that almost all forces are reacted (carried) by the intermediate layer 54 rather than the sensor 10A. Thus, the sensor 10A does not necessarily need to have a large force-carrying capability compared to sensor 10 (FIG. 2). Specifically, in contrast to the sensor 10A (FIG. 6) which carries a reduced load, substantially all of the forces F1 and F2 (FIG. 2) are transmitted through the sensor 10.

In general, sensor 10A may be configured to measure changes in the dimension T4. If the stiffness of the layer 54 is known, the force can be calculated based on the stiffness of the layer 54. For example, if the layer 54 is considered to be a spring governed by the equation F=kx, wherein F is the force, x is the displacement, and the k is the spring constant, the force acting on the pad and sensor assembly 100 can be calculated (estimated) based on the change in dimension T4 (i.e. x in the equation F=kx). However, the relationship between the applied forces F1 and F2 and the displacement T4 may be non-linear. Also, the pad and sensor assembly 100 may have different materials, sizes, and configurations. Thus, the pad and sensor assembly 100 may be tested to determine force vs. deflection empirically, and the resulting force versus deflection data (curve) can be utilized to determine the forces F1 and F2 based on changes in displacement (i.e. changes in T4). In some cases, a specific pad and sensor assembly 100 may be tested and calibrated to determine the forces F1 and F2 as a function of changes in displacement T4. Alternatively, the material properties of the resilient sheets 52, 54, and 56 may be utilized to determine the force versus deflection for a specific pad and sensor assembly 100.

If sensor 10A is configured to measure force, the forces F1 and F2 can be determined utilizing the relative stiffnesses of sheet 54 and sensor 10A. For example, if the sensor 10A and sheet 54 are both governed by the equation F=kx, the displacement x of sensor 10A and sheet 54 will be equal and the total force can be determined based on the force measured by the sensor 10A and the stiffnesses of the sensor 10A and pad 54. Alternatively, testing may be utilized to determine the relationship between total force (F1 and F2 and force measured by sensor 10A.

Sensor 10A may also, or alternatively, be configured to measure shear forces or changes in displacement due to forces F3 and F4 (i.e. changes in shear). A single sensor 10A capable of measuring changes in the dimension T4 and shear (displacement or force) may be utilized, or the pad and sensor assembly 100 may include a first sensor 10A specifically configured to measure shear, and a second sensor that is specifically configured to measure changes in the dimension T4. Total applied shear forces F3, F4 may be determined utilizing shear stiffness or measured shear force in substantially the same manner as discussed above in connection with forces F1 and F2.

In addition to changes in dimension T4 and force, sensor 10A may also be configured to determine velocity (i.e. the first derivative dimension T4 with respect to time) and/or acceleration (i.e. a second derivative of T4 with respect to time). The velocity and/or acceleration may be measured directly by sensor 10A, or the velocity and/or acceleration may be determined by taking a numerical derivative of T4 with respect to time.

Figure 8:
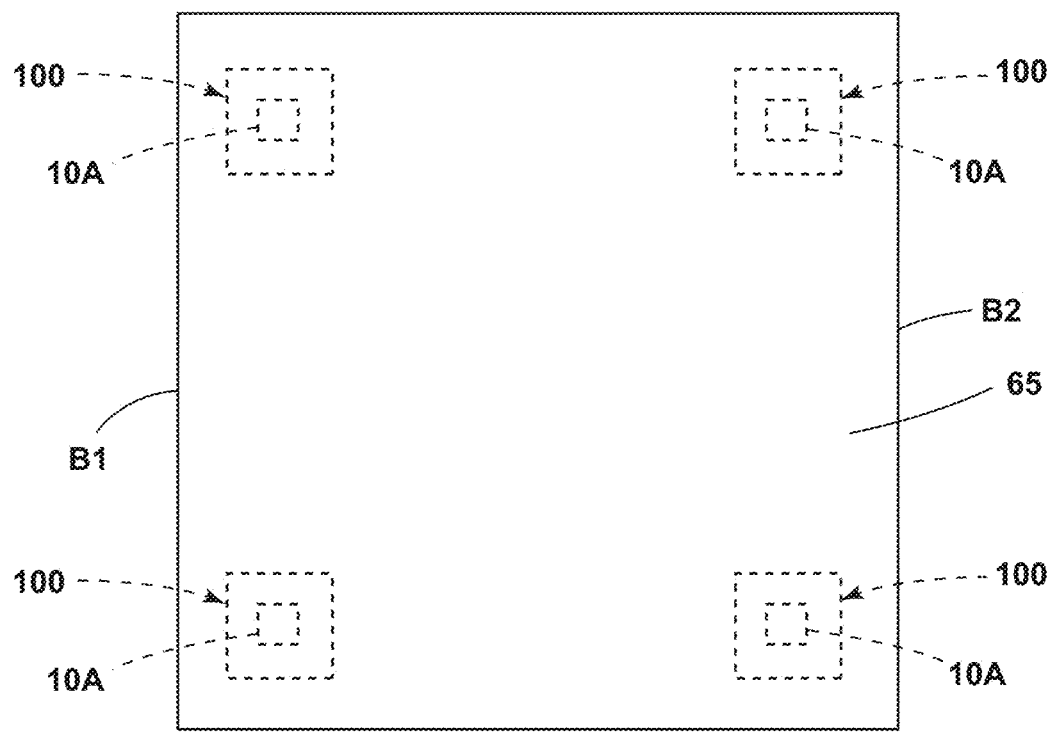
FIG. 8 is a schematic top plan view of a structure and a plurality of resilient pads and sensors.
Figure 9:
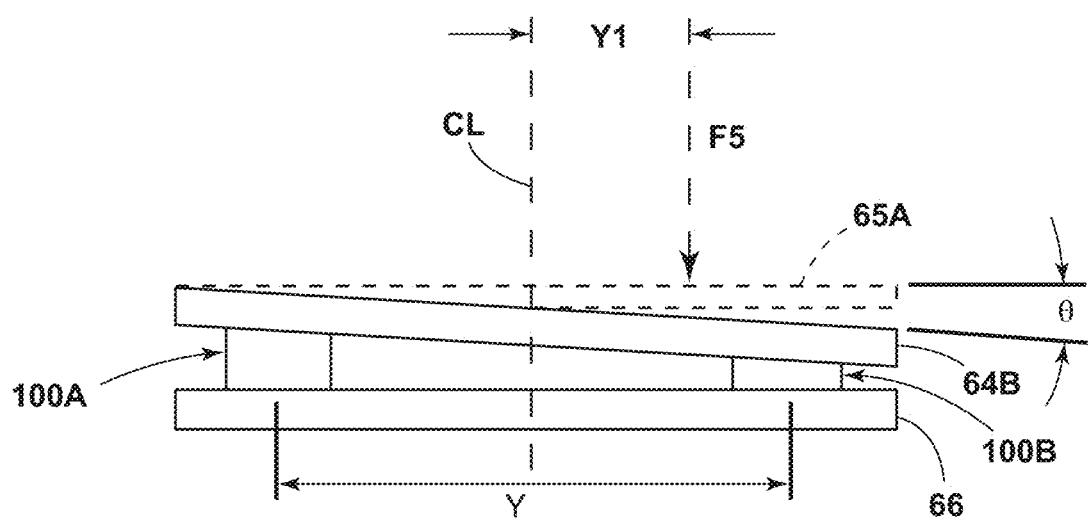
FIG. 9 is a schematic front elevational view of the structure and resilient pads of FIG. 8.

With further reference to FIGS. 8 and 9, the structure 65 may be supported by a plurality of pad and sensor assemblies 100. If a force F5 (FIG. 9) is applied at a location that is offset a distance Y1 from a center line CL, the structure 65 will move (rotate) from an initial position 65A to a second position 65B, with the upper structure 65 rotating through an angle θ. This rotation causes pad and sensor assemblies 100B to be compressed a larger amount than pad and sensor assembly 100A due to the increased force acting on pad and sensor assemblies 100B (it will be understood that the angle θ is exaggerated in FIG. 9 for purposes of illustration). In general, the dimension "Y" between the pad and sensor assemblies 100A and 100B is known, and the differences in vertical displacement T4 between the pad and sensor assemblies 100A and 100B can therefore be utilized to determine the angle θ utilizing, for example, known trigonometric functions (e.g. arctan). Thus, a structure 65 that is supported by a plurality of pad and sensor assemblies 100 may be monitored to determine both rotation of structure 65 and/or vertical displacement and/or horizontal displacement.

Figure 10:
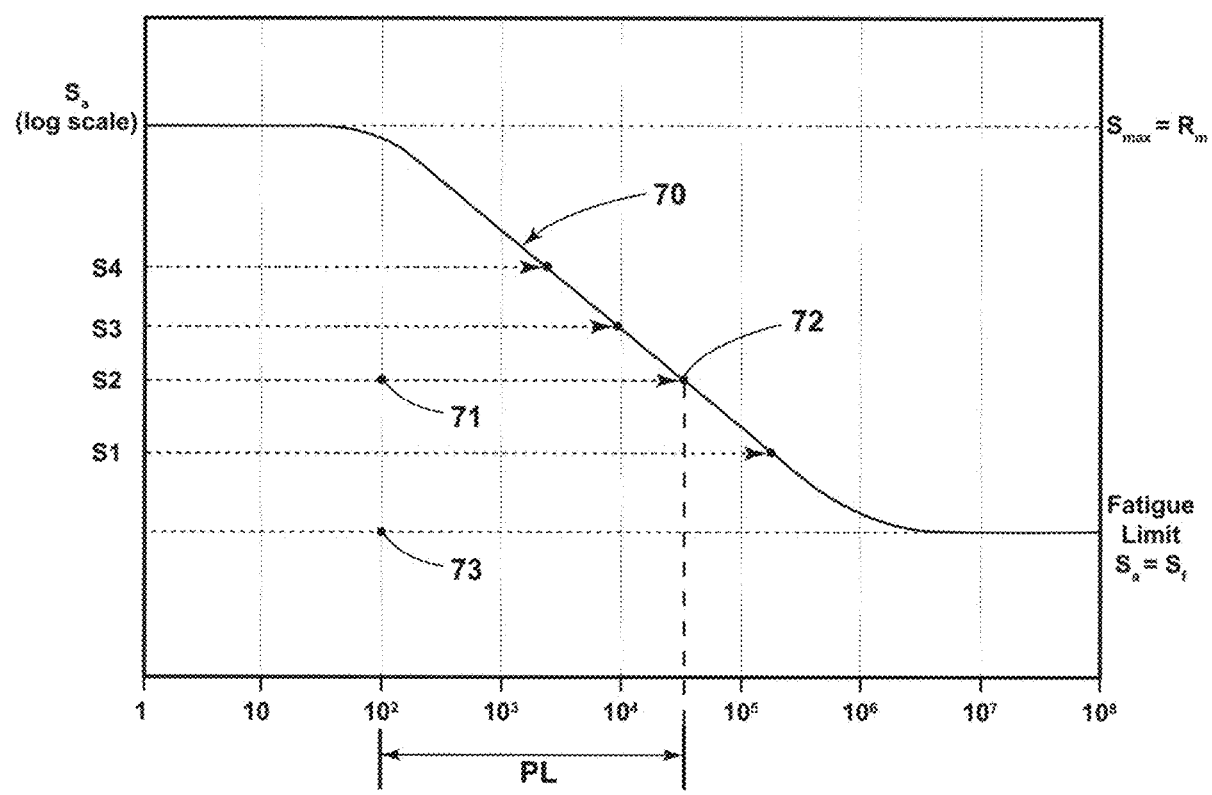
FIG. 10 is a graph showing an S-N curve describing the relation between cyclic stress amplitude and number of cycles to failure.

With further reference to FIG. 10, a structure supported by a bearing pad 1 or 100 according to the present disclosure may experience stress levels throughout the structure that may be cyclical in nature, and the materials may have a life cycle (material property) corresponding to S-N curve 70. S-N curve 70 is an example of a typical fatigue curve that describes the relation between cyclic stress amplitude and number of cycles to failure for a material. In FIG. 10, the horizontal axis represents the number of cycles to failure shown on a logarithmic scale, and the vertical axis is the stress amplitude of each cycle. It will be understood that the curve 70 is merely an example of one possible S-N curve, and the actual S-N curve 70 utilized for a particular structure is selected based on the material properties and materials of the structure.

Various life model profiles S1, S2, S3, S4, etc. may be developed, and the system (e.g. computing device 5, FIGS. 1 and 3) may be configured to determine which profile (e.g. S1-S4) is closest to the measured data from the sensor 10, 10A of the resilient pad 1, 100. For example, a bridge 2 (FIG. 3) may be subject to loads L that are cyclical due to vehicles moving over bridge 2. A dynamic structural model of bridge 2 may be developed utilizing known computer modeling techniques to determine stress levels within the bridge 2 resulting from loads L. The relationship between applied loads L and measured loads at the pads can also be determined. For example, forces at resilient pads 100A and 100B as a function of applied loads L can be determined utilizing a dynamic structural model. Furthermore, the structural dynamic model can also be utilized to determine stress levels within bridge 2 as a function of the measured forces at the bearing pads. The forces measured by the pads can therefore be used to determine the stress levels S1-S4, etc. (FIG. 10) to thereby predict a remaining number of cycles to failure. For example, if the measured data from the pad sensors indicate that $10^2$ cycles have occurred at a stress level S2 (point 71), a predicted remaining number of cycles "PL" can be determined. Restated, PL corresponds to a predicted number of cycles to failure. If the sensor data indicates that the material of the structure is at point 72, the system may determine that a failure has occurred or is imminent. If the system determines that the stress levels correspond to a level at or below the fatigue limit (e.g. point 73), the system may determine that no failure is predicted. Thus, the stress levels S1, S2, S3, S4 can be determined utilizing a structural model and the measured forces, and the number of cycles can also be determined using data from the sensor. S-N curve 70 or other appropriate criteria can then be utilized to predict a remaining life of the structure and/or indicate that a failure has occurred or is about to occur. One or more computing devices 12 may be configured to generate one or more of predicted lifetime, impending failure, and/or existing failure utilizing measured data, result stresses, and material properties. The characteristic curves for the Fatigue can be changed and uploaded based on the structure requirements.

The system (e.g. computing device 5) may also be configured to detect and/or predict failure based on other measurements. For example, bridge 2 (FIG. 3) may have one or more natural frequencies at which the bridge 2 vibrates due to input loads L. The sensors 10, 10A of the resilient pads may be configured to detect the amplitude of the vibrations at the natural frequencies, and changes in the natural frequencies of the bridge structure 2 may be utilized to indicate or detect a failure or impending failure. For example, if the first natural mode of the bridge 2 or other structure is 10 Hz, and if data from the sensors indicates that the first natural mode has shifted to 8 Hz, this change in natural frequency may indicate that a failure has occurred, or is imminent. Computing devices 5 and/or 12 may be configured to utilize predefined failure criteria (e.g. a detected natural frequency that is sufficiently different from an expected natural frequency) to generate a failure signal or a warning signal that structural degradation has been detected.

Still further, other changes in sensor data may also be utilized to detect failure and/or predict failure of a structure supported by the bearing pads. For examples, if a bridge 2 (FIG. 3) or other structure is supported by a plurality of bearing pads (e.g. four bearing pad assemblies 100) as shown in FIG. 8), a force acting on the bridge 2 will be distributed among the bearing pad assemblies 100 due to the redundant load paths. If the structural integrity of the structure (e.g. bridge 2) changes (degrades), the distribution of the loads among the bearing pad assemblies 100 may change due to a local failure of the structure that is being supported. The system (e.g. computing device 5 and/or 12) may be configured to detect and/or predict failure if the bearing pad assemblies 100 detect a change in the force distribution among the redundant bearing pad assemblies 100. For example, if bridge 2 (FIG. 3) includes four sensing pads 100 (similar to the arrangement of FIG. 8), a vehicle passing over the bridge may be expected to result in substantially similar force measurements from pads 100 adjacent side B1 as the vehicle initially goes on to the bridge, and the sensors 100 adjacent side B2 would be expected to measure a similar force as the vehicle exits the side B2 of the bridge. However, if a portion of the bridge structure 2 is failing (i.e. has reduced structural integrity), as a vehicle crosses the bridge 2, the distribution of the forces measured by the pads 100 adjacent side B1 may be different than the forces measured adjacent the side B2 due to the degradation of the structural integrity of the structure, which in turn causes a changes in the distribution of forces among the bearing pad assemblies 100. Computing devices 5 and/or 12 may be configured to generate a warning or alert if predefined force measurement criteria (change in force distribution) is detected.

It will be understood that the examples above regarding bridge 2 merely illustrates the concepts, and the present disclosure is not limited to any specific structure. In particular, the bearing pad assemblies 100 may be utilized in connection with a building 3, machinery 4, or virtually any other type of structure of machinery to monitor the structure and detect failures, degradation of the structure, and/or to predict a lifespan or failure of the structure.

In general, the bearing pad and system of the present disclosure may be utilized to monitor one or more structures to supplemental or reduce the inspections that may otherwise be required. For example, the system may be utilized to monitor a bridge, and the system may be configured to generate and alert if a structural failure is detected. If a structural failure is detected, the bridge or other structure can then be inspected to determine the cause of the failure, required repairs, etc.

These and other features, advantages, and objects of the present invention will be further understood and appreciated by those skilled in the art by reference to the following specification, claims, and appended drawings.

The invention claimed is:

1. A support system for building structures and bridge structures that are immovably supported on stationary base structures, the support system comprising:
   a resilient pad having an upper side that is configured to engage a surface of a building structure or a surface of a bridge structure, and a lower side that is configured to engage a stationary base structure to support a building structure or a bridge structure whereby a dimension between the upper and lower sides changes as a result of changing loads being applied to the upper and lower sides;
   a sensor that generates displacement data due to changes in the dimension between the upper and lower sides when changing loads are applied to the upper and lower sides of the resilient pad; and
   a computing device that is configured to utilize the displacement data to: 1) determine if the displacement data indicates that structural degradation meeting predefined structural failure criteria for the building structure or the bridge structure is imminent or has occurred, and/or: 2) determine a predicted lifespan of the building or bridge structure based on a predicted structural failure of the building or bridge structure.

2. The support system of claim 1, wherein-:
   the resilient pad includes a cavity;
   the sensor is disposed in the cavity.

3. The support system of claim 2, wherein:
   the sensor comprises a piezoelectric sensor.

4. The support system of claim 2, wherein:
   the resilient pad includes resilient material disposed between the cavity and the first side.

5. The support system of claim 4, wherein:
   the resilient pad includes resilient material disposed between the cavity and the second side.

6. The support system of claim 5, wherein:
   the resilient pad includes at least one transverse surface extending between surfaces of the upper and lower sides;
   the resilient pad incudes resilient material disposed between the cavity and the at least one transverse surface.

7. The support system of claim 6, wherein:
   the at least one transverse surface comprises a peripheral surface extending between the surfaces of the upper and lower sides around a periphery of the resilient pad.

8. The support system of claim 1, wherein:
   the resilient pad comprises resilient first and second layers and a resilient central layer sandwiched between the resilient first and second layers, wherein the resilient central layer has an opening therethrough forming a cavity, and wherein the sensor is disposed in the cavity between the resilient first and second layers.

9. The support system of claim 8, wherein:
   opposite sides of the resilient central layer are bonded to the resilient first and second layers.

10. The support system of claim 1, wherein:
    the computing device is configured to utilize the displacement data to determine at least one of a velocity of the upper side relative to the lower side, and an acceleration of the upper side relative to the lower side.

11. The support system of claim 1, wherein:
    the computing device is configured to determine a predicted lifespan of the building structure or the bridge structure utilizing a material property comprising a relation between cyclic stress amplitude and number of cycles to failure.

12. The support system of claim 1, wherein;
    the computing device is configured to determine that a failure of the building structure or the bridge structure has occurred if the displacement data indicates that a change in loading on the resilient pad meeting predefined failure criteria has occurred.

13. The support system of claim 1, wherein:
    a plurality of resilient pads and sensors are operably connected to the computing device, wherein the plurality of resilient pads and sensors are configured to support a single building structure or a single bridge structure; and
    the controller is configured to determine rotation of the single building structure or the single bridge structure relative to a stationary base structure below the plurality of resilient pads and sensors utilizing displacement data from the plurality of sensors.

14. A support system comprising:
    a resilient pad having first and second opposite sides that are configured to engage two surfaces to support a building structure or a bridge structure, or an immovable stationary base structure;
    a sensor that generates sensor data responsive to loads applied to at least one of the first and second opposite sides of the resilient pad;
    a computing device that is configured to utilize the sensor data to: 1) determine if the sensor data indicates that degradation meeting predefined failure criteria for at least one of the resilient pad and the structure is imminent or has occurred, and/or: 2) determine a predicted lifespan of the resilient pad and/or the structure; and
    the computing device is configured to determine a predicted lifespan of the building structure or the bridge structure by comparing measured loads and numbers of cycles to a predicted number of cycles at which structural failure of the building structure or the bridge structure would occur at the measured loads.

15. A method of monitoring a structure, the method comprising:
    positioning a plurality of resilient pads on a stationary base structure;
    supporting a structure on the plurality of resilient pads, the plurality of resilient pads having sensors configured to measure at least one parameter related to forces acting on the resilient pads;
    utilizing a predefined relationship between the measured parameter and a predicted structural degradation of the structure to determine at least one of structural degradation of the structure and a predicted structural failure of the structure due to structural degradation of the structure, wherein:
    the structure is substantially stationary other than movement of the structure relative to the stationary base structure due to deformation of one or more of the resilient pads.

16. The method of claim 15, wherein:
the structure comprises a building structure or a bridge structure;
the parameter measured by the sensors comprises force; and including:
utilizing a computer model of the building or bridge structure to determine stress levels in the building or bridge structure as a function of forces acting on the resilient pads;
utilizing a material property of the building or bridge structure to determine a predicted failure of the building or bridge structure.

17. The method of claim 16, wherein:
the forces acting on the resilient pads are cyclical; and including:
utilizing an S-N curve comprising a relationship between cyclic stress amplitude and number of cycles to failure to determine a predicted structural failure of the building or bridge structure.

18. The method of claim 15, wherein:
the structural integrity of the building or bridge structure degrades over time;
degradation of the structural integrity of the building or bridge structure results in changes in the measured parameter; and including:
utilizing the measured parameter and predefined criteria to determine the present structural integrity of the building or bridge structure.

19. The method of claim 18, wherein:
degradation of the structure results in at least one of: 1) a change in force distribution among the sensors, and: 2) a change in a natural frequency of the structure that can be detected based on the measured parameter;
the present structural integrity of the structure is determined, at least in part, based on at least one of: 1) a change in force distribution among the sensors, and: 2) a change in a natural frequency of the structure.

20. The method of claim 15, including:
utilizing the measured parameter to: 1) detect a failure of at least one resilient pad, and/or: 2) predict a lifespan of at least one resilient pad.

21. The method of claim 15, including:
utilizing data from the sensors to determine movement of the structure relative to the stationary base structure.

22. The method of claim 21, wherein:
determining movement of the structure relative to the stationary base structure includes determining a rotation of the structure relative to the stationary base structure.

* * * * *